United States Patent [19]
Koizumi

[11] 4,087,850
[45] May 2, 1978

[54] POWER SUPPLY CIRCUIT

[75] Inventor: Akio Koizumi, Tokyo, Japan

[73] Assignee: Sony Corporation, Tokyo, Japan

[21] Appl. No.: 760,973

[22] Filed: Jan. 21, 1977

[30] Foreign Application Priority Data

Jan. 29, 1976 Japan .................................. 51-8684

[51] Int. Cl.² .......................................... H02M 3/335
[52] U.S. Cl. ......................................... 363/21; 363/80
[58] Field of Search ................. 307/240; 321/2, 9 A, 321/18, 19; 363/18–21, 79, 80, 97

[56] References Cited
U.S. PATENT DOCUMENTS

| | | | |
|---|---|---|---|
| 3,514,688 | 5/1970 | Martin | 321/2 |
| 3,559,030 | 1/1971 | Bussard | 321/18 X |
| 3,657,631 | 4/1972 | Martens et al. | 321/2 |
| 3,704,403 | 11/1972 | Gillett | 321/9 A X |
| 3,733,519 | 5/1973 | Griffey | 321/2 X |
| 3,967,159 | 6/1976 | Dendy et al. | 321/2 X |

OTHER PUBLICATIONS

IBM Technical Disclosure Bulletin, "Pulse-Width Modulated DC-to-DC Converter", vol. 19, No. 5, Oct. 1976, pp. 1530–1533.

Primary Examiner—William M. Shoop
Attorney, Agent, or Firm—Hill, Gross, Simpson, Van Santen, Steadman, Chiara & Simpson

[57] ABSTRACT

In a power supply circuit having a circuit for supplying an input DC voltage through a switching element to a winding, a circuit for producing a desired DC voltage by switching the switching element with a pulse and a circuit for detecting the level of the DC output voltage, and changing the duty ratio of the pulse with the detected output so as to stabilize the DC output voltage at a constant value. There is provided a circuit which limits the maximum value of the duty ratio of the pulse.

5 Claims, 11 Drawing Figures

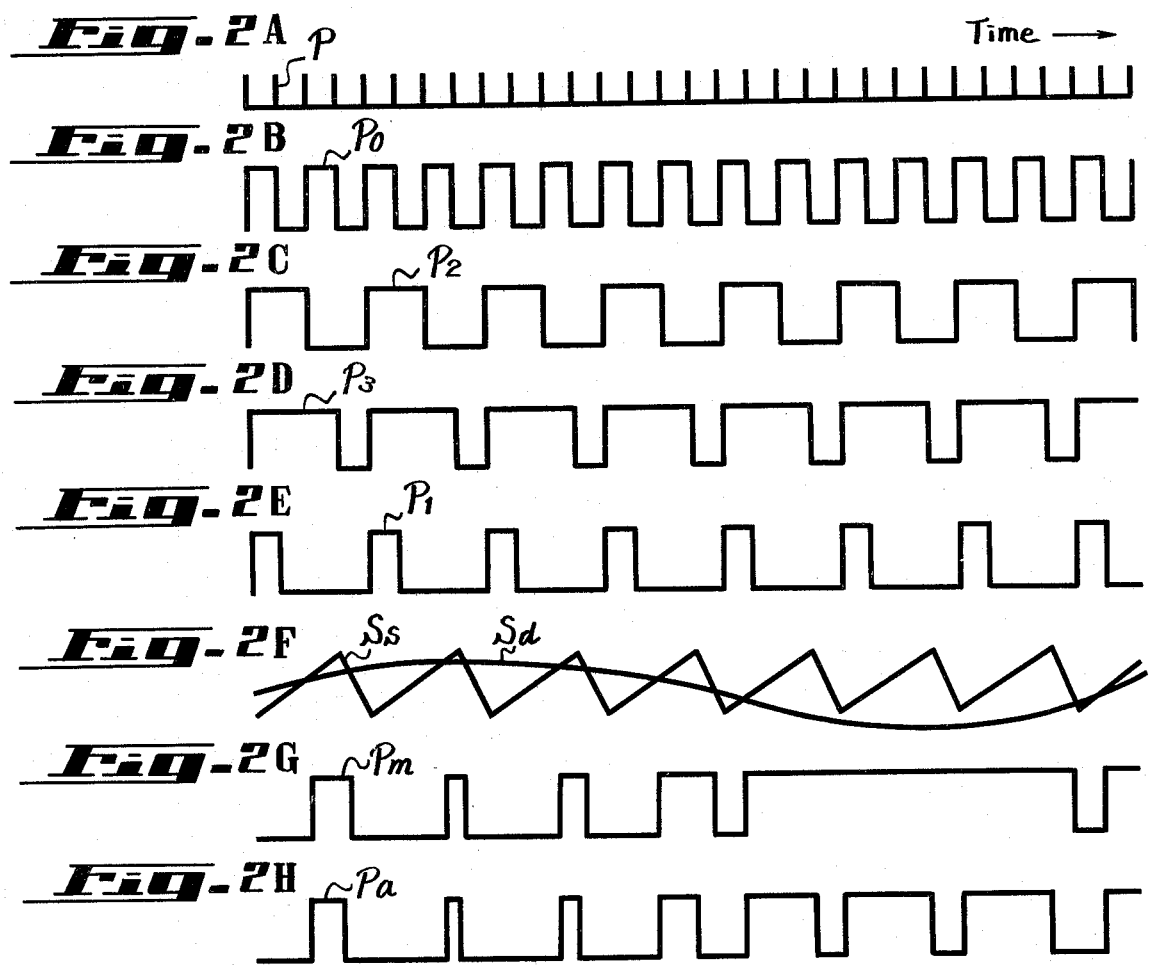
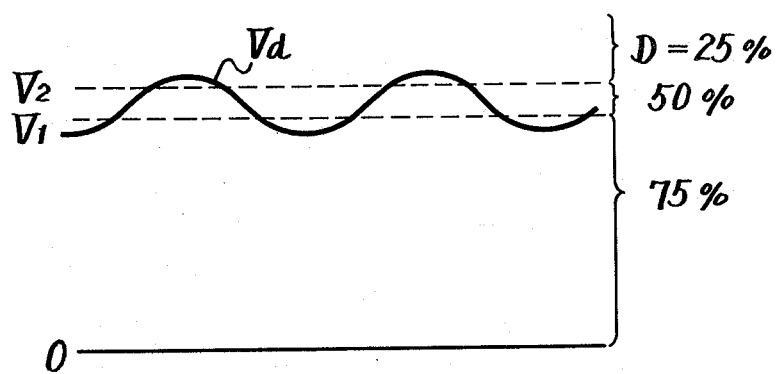

POWER SUPPLY CIRCUIT

BACKGROUND OF THE INVENTION

1. Field of the Invention

This invention relates generally to a power supply circuit, and more particularly to a novel power supply circuit having a circuit limiting the duty ratio of a pulse signal to be supplied to a switching element.

2. Description of the Prior Art

In a known stabilized power supply circuit, a commercial AC voltage is fed through a power plug and a power switch to a rectifier circuit and converted to a DC voltage. This DC voltage is applied to a series connection of the primary winding of a transformer and a switching transistor which is supplied with a PWM (pulse width modulated) pulse signal from a PWM modulator to be switched ON and OFF. Thus, an AC voltage is induced across the secondary winding of the transformer and then fed to a rectifying circuit to be rectified as a DC voltage. This DC voltage is delivered to an output terminal.

In this case, the DC voltage delivered to the output terminal is detected by a detecting circuit whose detected output is supplied through a coupler for insulation and separation such as a photo-coupler to a modulation circuit as its modulating signal. This modulation circuit is supplied with a pulse signal from an oscillating circuit as a carrier. Thus, the pulse width of the PWM pulse from the modulation circuit is changed in accordance with the voltage at the output terminal, and thus the DC voltage at the output terminal is stabilized at a constant value.

In this case, the modulation circuit produces, for example, a triangular wave signal $S_t$ based upon the pulse signal from the oscillating circuit. The signal $S_t$ and the signal $S_d$ from the detecting circuit are level-compared and hence a PWM pulse $P_m$ is produced which is "1" when $S_t \geq S_d$ and "0" when $S_t < S_d$.

When a load connected to the output terminal becomes heavy, the signal $S_d$ reaches a very low level. As a result, at this time the duty ratio of the pulse $P_m$ exceeds a set value (which is usually about 70~80%) and hence the modulation becomes 100% at this time (overmodulation).

With the above prior art power supply circuit, during the ON-period of the switching transistor energy is stored in the primary winding of the transformer and is derived from the secondary winding of the transformer during the OFF-period of the switching transistor. Thus, when the duty ratio of the pulse $P_m$ exceeds the set value, a current is fed to the primary winding before an output current from the secondary winding becomes zero during the OFF-period of the switching transistor. As a result, there occurs a fear that the core of the transformer is saturated and then damaged, which would cause the transformer to be damaged or the rectifying circuit to be damaged also.

Further, there may appear a case where an output voltage $V_d$ of the rectifying circuit contains fluctuation components such as ripple components. In such a case, if a tolerance value (maximum value) of the duty ratio of the pulse $P_m$ is set for the minimum value of the voltage $V_d$, at the maximum value of the voltage $V_d$ a current greater than at the minimum value of the voltage $V_d$ will flow to the primary winding, so that the transformer, transistor or rectifying circuit is damaged due to the same reason as that set forth above.

OBJECTS AND SUMMARY OF THE INVENTION

It is an object of the invention to provide an improved power supply circuit.

It is another object of the invention to provide a power supply circuit in which the duty ratio of a switching signal supplied to a switching element is limited at its maximum value so as to keep circuit elements safe.

It is a further object of the invention to provide a power supply circuit which produces a stabilized output DC voltage even if the load fluctuates.

It is a further object of the invention to provide a power supply circuit which produces a stabilized output DC voltage without causing damage to the circuit elements even if the value of the input DC voltage is changed.

It is a yet further object of the invention to provide a power supply circuit in which a signal to be modulated is provided by the combination of an oscillator and a frequency divider circuit, and hence the frequency of the oscillator can be selected high and the whole circuit can be made simple.

It is a still further object of the invention to provide a power supply circuit in which input and output voltages are detected, respectively, and a switching signal for switching a switching element is produced based upon the detected outputs to prevent the switching elements, rectifying circuit and transformer from being damaged.

According to an aspect of the present invention, there is provided a power supply circuit which comprises an input DC voltage source, a winding connected to said DC voltage source, a switching element connected to said coil, a circuit for producing an AC voltage in response to the switching function of said switching element, a circuit for converting said AC voltage to a DC voltage, a circuit for detecting said DC voltage and for producing a detected DC output signal in response to said DC voltage, an oscillator for generating pulse signals, a modulator supplied with said pulse signal and said detected DC output signal and for producing pulse width modulated signals in response to said detected DC output signal, a circuit for supplying said pulse width modulated signals to said switching element, and a limited circuit for limiting the maximum value of the duty ratio of said pulse width modulated signal.

The other objects, features and advantages of the present invention will become apparent from the following description taken in conjunction with the accompanying drawings.

BRIEF DESCRIPTION OF THE DRAWINGS

FIGS. 2A to 2H, inclusive are waveform diagrams showing signals flowing through the power supply circuit shown in FIG. 1; and FIG. 3 is a graph showing the relationship between an input voltage and the duty ratio of a switching signal.

DESCRIPTION OF THE PREFERRED EMBODIMENT

Figure 1:
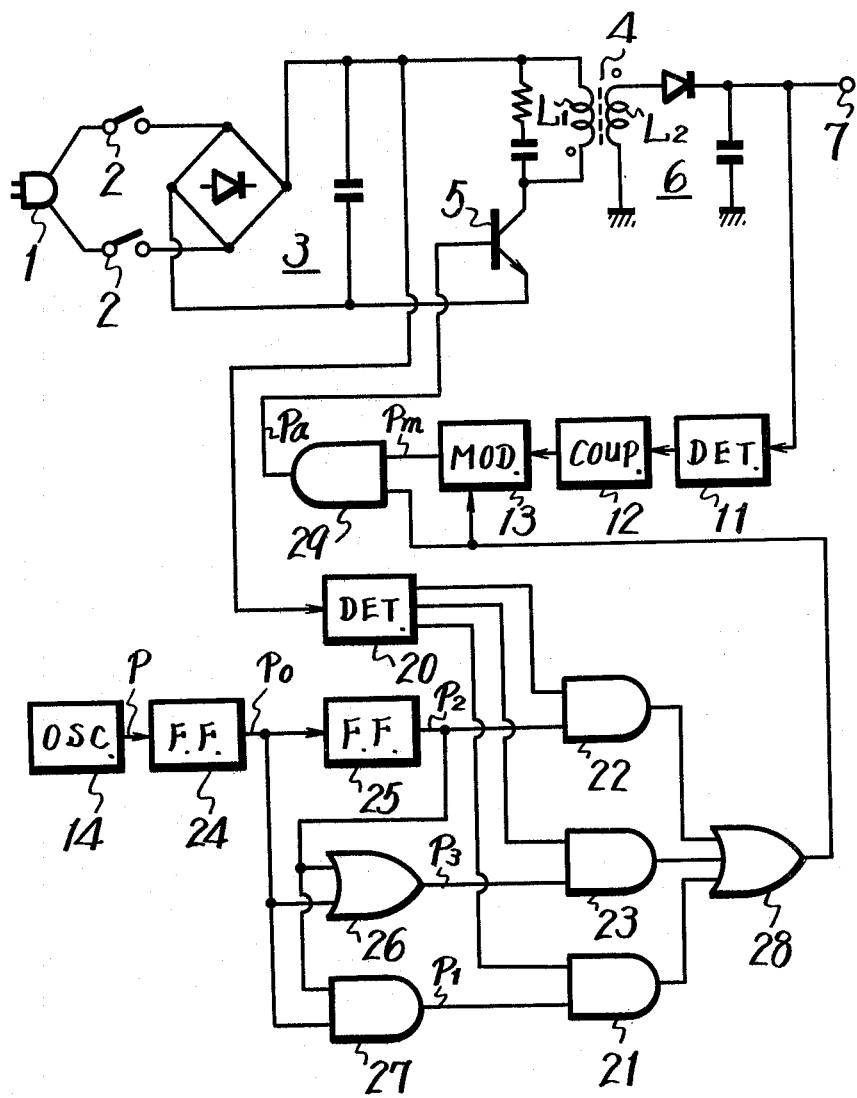
FIG. 1 is a block diagram showing an example of the power supply circuit according to the present invention.

An embodiment of the power supply circuit according to the present invention will be hereinafter described with reference to FIG. 1 which is a block diagram thereof.

With the example of FIG. 1, a commercial AC voltage is supplied from a power plug 1 through power switches 2 to a full-wave rectifying circuit or a full-wave rectifier 3 which then produces a rectified and smoothed DC voltage and hence serves as a DC voltage source. The DC voltage therefrom is fed to a series connection of a primary winding $L_1$ of a transformer 4 and a transistor 5 which serves a switching element. This transistor 5 is supplied, at its base, with a switching signal which switches the transistor ON and OFF. Thus, an AC voltage is induced across a secondary winding $L_2$ of the transformer 4 and then applied to a second rectifying circuit or rectifier 6 which converts the AC voltage to a DC voltage and delivers the same to an output terminal 7. The DC voltage at the output terminal 7 is detected by a detecting circuit 11. The output from the detecting circuit 11 is supplied through a coupler for isolation and separation such as a photo-coupler 12 to a modulating circuit 13 which is also supplied with a pulse from an oscillating circuit 14 and modulates its pulse width in response to the detected DC output signal from the detecting circuit 11. The pulse width modulated (PWM) signal from the modulating circuit 13 is supplied to the transistor 5 as the switching signal.

The broad aspects of the circuit construction described above is generally known.

The power supply circuit of the invention shown in FIG. 1 includes a circuit, which will limit the maximum value of the duty ratio of the switching signal or pulse fed to the transistor 5, and a circuit which will vary the maximum value of the duty ratio of the pulse in response to the value of the DC voltage from the full-wave rectifier 3. To this end, with the power supply circuit of the invention shown in FIG. 1, the oscillating circuit 14 produces a pulse P shown in FIG. 2A whose frequency is selected as about 80 to 200 KHz. This pulse P is fed to a flip-flop circuit 24 which serves as a frequency divider. This flip-flop circuit 24 produces a rectangular pulse $P_o$ whose duty ratio is 50% and whose frequency is ½ of that of the pulse P, as shown in FIG. 2B. This pulse $P_o$ is fed to a flip-flop circuit 25 which also serves as a frequency divider and produces a rectangular pulse $P_2$ whose duty ratio is 50% and whose frequency is ¼ of that of the pulse P or 20 to 50 KHz. This pulse $P_2$ is fed to an AND-gate circuit 22.

The pulses $P_o$ and $P_2$ from the flip-flop circuits 24 and 25 are applied to an OR-gate circuit 26 which produces a rectangular pulse $P_3$ whose frequency is the same as that of the pulse $P_2$ and whose duty ratio is 75% as shown in FIG. 2D. This pulse $P_3$ is fed to an AND-gate circuit 23. The pulses $P_o$ and $P_2$ from the flip-flop circuits 24 and 25 are fed also to an AND-gate 27 which produces a rectangular pulse $P_1$ whose frequency is the same as that of the pulse $P_2$ and whose duty ratio is 25%. This pulse $P_1$ is applied to an AND-gate circuit 21.

The output voltage $V_d$ (refer to FIG. 3) from the rectifier 3 is fed to a detecting circuit 20 which detects the level of the voltage $V_d$. The detecting circuit 20 supplies the signal of "1" to the AND-gate circuit 23 when $V_d \leq V_1$; the signal of "1" to the AND-gate circuit 22 when $V_1 < V_d \leq V_2$; and the signal of "1" to the AND-gate circuit 21 when $V_d > V_2$, as shown in FIG. 3.

Accordingly, when $V_d \leq V_1$ by way of example, the pulse $P_3$ is derived from the AND-gate circuit 23 and supplied through an OR-gate circuit 28 to the modulating circuit 13 as its carrier. Then, this modulating circuit 13 integrates the pulse $P_3$ to make a saw-tooth wave signal $S_S$ as shown in FIG. 2F, and level-compares this signal $S_S$ and the detected signal $S_d$ from the detecting circuit 11 through the coupler 12. Thus, this modulating circuit 13 produces a PWM pulse signal $P_m$ shown in FIG. 2G.

This PWM pulse signal $P_m$ is supplied to an AND-gate circuit 29 which is also supplied with the pulse $P_3$ from the AND-gate circuit 23 through the OR-gate circuit 28 in this case. Accordingly, the AND-gate circuit 29 produces a pulse $P_a$ as an AND-output of the pulses $P_m$ and $P_3$ which pulse $P_a$ is shown in FIG. 2H. This pulse $P_a$ is applied to the transistor 5.

Thus, the transistor 5 is switched ON and OFF with the pulse $P_a$. In this case, since the pulse $P_a$ is the PWM pulse which is pulse width modulated with the detected output signal $S_d$, a predetermined DC voltage can be obtained at the output terminal 7.

Further, in this case the pulse $P_a$ is the AND-output of the pulses $P_m$ and $P_3$, so that the duty ratio of the pulse $P_a$ is not greater than 75% due to the pulse $P_3$. That is, as shown in FIG. 3, in the case of $V_d \leq V_1$, the maximum value D of the duty ratio of the pulse $P_a$, which carries out the switching operation of the transistor 5, is limited to 75%. Thus, even if the load is heavy, it avoids saturation of the core of the transformer 4 and hence avoids damage to the transformer 4, the transistor 5, and also the rectifier 6.

While, in the case of $V_1 < V_d \leq V_2$, the pulse $P_2$ is derived through the AND-gate circuit 22, and in the case of $V_d > V_2$, the pulse $P_1$ is derived through the AND-gate circuit 21. The pulse $P_2$ or $P_1$ is fed through the OR-gate circuit 28 to the modulating circuit 13 and AND-gate circuit 29, respectively. Thus, the similar PWM pulse $P_a$ is derived from the AND-gate circuit 29 and then fed to the transistor 5. As a result, in the case of $V_1 < V_d \leq V_2$, the maximum value D of the duty ratio of the pulse $P_a$, which serves to carry out the switching operation of the transistor 5, is limited to 50%, and in the case of $V_d > V_2$, the maximum value D is limited to 25%, respectively.

Accordingly, with the power supply circuit of the invention, even if the load is heavy, the transformer 4 and transistor 5 or the rectifier 6 are prevented from being damaged. Also, even under the assumption that the output voltage $V_d$ from the full-wave rectifier 3 contains fluctuation components such as a ripple voltage, when the voltage $V_d$ is high, the maximum value D of the duty ratio of the pulse $P_a$ is limited to 25%. Therefore, it is avoided that the transformer 4 and transistor 5 of the rectifier 6 are destroyed. When the output voltage $V_d$ from the rectifier 3 is low, the maximum value D of the duty ratio of the pulse $P_a$ becomes 75%, an output voltage can be positively obtained at the output terminal 7 even though the load is heavy.

As described above, according to the power supply circuit of this invention, destruction of the transformer 4 and transistor 5 or rectifier 6 by the fluctuation of the load can be avoided, and also the destruction of other similar elements by the voltage fluctuation at the input side can be avoided.

Further, since the flip-flop circuits 24 and 25 carry out the frequency division of the pulse from the oscillator 14, the oscillation frequency of the oscillator 14 can be selected high. As a result, its additional capacitor can be selected low in capacity, and hence the circuit can be made at low cost when the circuit is made as an integrated circuit.

Also, for a similar reason, a quartz oscillating circuit can be used as the oscillating circuit 14 and the synchronization thereof to other oscillating circuits can be easily done.

The above description is given as an example of applying the invention to a so-called ON-OFF system, but it will be easily understood that this invention can be applied to a so-called chopper system.

It will be apparent that many modifications and variations could be effected by one skilled in the art without departing from the spirit or scope of the novel concepts of the invention, so that the scope of the invention should be determined by the appended claims.

I claim as my invention:

1. A power supply circuit comprising:
   (a) an input DC voltage source;
   (b) a winding connected to said DC voltage source;
   (c) a switching means connected to said winding;
   (d) means for producing an AC voltage in response to the switching function of said switching means;
   (e) means for converting said AC voltage to an output DC voltage;
   (f) means for detecting said output DC voltage and for producing a detected DC output signal in response to said output DC voltage;
   (g) an oscillator for generating pulse signals;
   (h) a modulator supplied with said pulse signals and said detected DC output signal and for producing pulse width modulated signals in response to said detected DC output signal;
   (i) means for supplying said pulse width modulated signals to said switching means; and
   (j) means for limiting a maximum value of the duty ratio of said pulse width modulated signal, said limiting means including means for frequency-dividing said pulse signals from said oscillator and an AND-gate circuit which is supplied with an output signal from said frequency-dividing means and with the pulse width modulated signal from said modulator, for supplying an AND-gate output to said supplying means.

2. A power supply circuit according to claim 1 further including a second DC voltage detecting means which detects the voltage of said input DC voltage source and produces a second DC voltage output signal and a second AND-gate circuit supplied with said second DC voltage output signal and the output signal from said frequency-dividing means, an output from said second AND-gate circuit being supplied to said modulator and first-mentioned AND-gate circuit, respectively.

3. A power supply circuit as claimed in claim 2, wherein said frequency-dividing means includes first and second flip-flop circuits connected in series, an OR-gate circuit supplied with output signals from said first and second flip-flop circuits, and means for connecting said OR-gate circuit to said second AND-gate circuits.

4. A power supply circuit according to claim 3 further including a third AND-gate circuit supplied with an output signal from said second flip-flop circuit and said second DC voltage output signal, and a second OR-gate circuit supplied with output signals from said second and third AND-gate circuits.

5. A power supply circuit according to claim 4 further including a fourth AND-gate circuit supplied with output signals from said first and second flip-flop circuits, a fifth AND-gate circuit supplied with an output signal from said fourth AND-gate circuit and said second DC voltage signal and means for supplying an output signal from said fifth AND-gate circuit to said second OR-gate circuit.

* * * * *